United States Patent
Martin

(10) Patent No.: US 8,302,411 B2
(45) Date of Patent: Nov. 6, 2012

(54) POSITIVE SHUTOFF DEVICE FOR A CONNECTION POINT OF A REFRIGERATION SYSTEM

(75) Inventor: J. Scott Martin, Conyers, GA (US)

(73) Assignee: Hill PHOENIX, Inc., Conyers, GA (US)

( * ) Notice: Subject to any disclaimer, the term of this patent is extended or adjusted under 35 U.S.C. 154(b) by 658 days.

(21) Appl. No.: 12/355,558

(22) Filed: Jan. 16, 2009

(65) Prior Publication Data

US 2010/0180617 A1 Jul. 22, 2010

(51) Int. Cl.
F25B 45/00 (2006.01)

(52) U.S. Cl. ............... 62/149; 62/174; 62/292

(58) Field of Classification Search .......... 62/149, 62/174, 292
See application file for complete search history.

(56) References Cited

U.S. PATENT DOCUMENTS

| | | | |
|---|---|---|---|
| 1,505,428 A | 8/1924 | Richards et al. | |
| 1,876,988 A | 9/1932 | Lormor | |
| 2,250,122 A | 7/1941 | Bjarnson | |
| 3,043,553 A | 7/1962 | Gorman | |
| 3,754,575 A | 8/1973 | Korhonen-Wesala | |
| 3,861,641 A | 1/1975 | Kolic | |
| 4,069,686 A | 1/1978 | Hoelman | |
| 4,091,815 A | 5/1978 | Larsen | |
| 4,262,876 A | 4/1981 | Willatt | |
| 4,535,802 A * | 8/1985 | Robertson | 137/322 |
| 4,582,292 A | 4/1986 | Glotzback et al. | |
| 4,601,177 A * | 7/1986 | Tanino et al. | 62/149 |
| 5,080,132 A * | 1/1992 | Manz et al. | 137/614.04 |
| 5,273,253 A | 12/1993 | Rogers | |
| 5,320,256 A * | 6/1994 | Wood | 222/212 |
| 5,397,100 A * | 3/1995 | Miller | 251/188 |
| 5,402,823 A | 4/1995 | Cole | |
| 5,692,729 A | 12/1997 | Harhen | |
| 6,234,448 B1 | 5/2001 | Porat | |
| 6,340,096 B1 | 1/2002 | Zerfas | |
| 6,561,237 B1 | 5/2003 | Brass et al. | |

(Continued)

FOREIGN PATENT DOCUMENTS

JP 06-074615 3/1994

(Continued)

OTHER PUBLICATIONS

U.S. Appl. No. 12/132,384, filed Jun. 3, 2008, Bittner, John D.

(Continued)

Primary Examiner — Cheryl J Tyler
Assistant Examiner — Jonathan Bradford
(74) Attorney, Agent, or Firm — Foley & Lardner LLP

(57) ABSTRACT

A positive shutoff device is provided for a connection point of a refrigeration system. The connection point includes a manually-actuatable valve that permits charging and testing of the system. The device includes a first fitting engagable with the connection point and having a raised actuator that actuates the manually-actuatable valve when the first fitting engages the connection point, and a shutoff valve having a first end coupled to the first fitting and a second end coupled to a second fitting, the shutoff valve is operable in a closed position to prevent flow therethrough and an open position to permit flow therethrough, so that the refrigeration system may be charged or tested by connecting equipment to the second fitting and opening the shutoff valve, and the connection point may be positively shut off to prevent leakage of refrigerant through the connection point by closing the shutoff valve.

12 Claims, 2 Drawing Sheets

U.S. PATENT DOCUMENTS

| | | | |
|---|---|---|---|
| 6,575,078 B1 * | 6/2003 | Wright et al. | 91/491 |
| 2008/0190189 A1 * | 8/2008 | Milanovich et al. | 73/146.8 |
| 2009/0095359 A1 * | 4/2009 | Campau | 137/226 |

FOREIGN PATENT DOCUMENTS

| | | |
|---|---|---|
| JP | 09-033143 | 2/1997 |

OTHER PUBLICATIONS

International Search Report and Written Opinion for International Application No. PCT/US2010/020891, mail date Jul. 29, 2010, 7 pages.

* cited by examiner

POSITIVE SHUTOFF DEVICE FOR A CONNECTION POINT OF A REFRIGERATION SYSTEM

FIELD

The present invention relates to a positive shutoff device for a connection point in a refrigeration system. The present invention relates more particularly to a positive shutoff device for a connection point in a refrigeration system used for refrigerant charging and/or pressure-testing the system, and/or isolation of another type of coolant.

BACKGROUND

It is well known to provide a refrigeration system for use with one or more temperature controlled storage devices such as a refrigerator, freezer, refrigerated merchandiser, display case, etc. that may be used in commercial, institutional, and residential applications for storing or displaying refrigerated or frozen objects. For example, it is known to provide a refrigeration system having a refrigerant for direct expansion in a single loop operation to provide cooling to heat exchanger such as an evaporator or chiller. It is also known to provide a connection point for readily attaching refrigerant charging equipment and/or pressure testing equipment to charge or pressure test the piping and other components of the system. However, such known connection points tend to leak over time and result in loss of refrigerant from the system and the need for expensive re-charging and pressure testing activities. A positive shutoff device for use with a charging and testing connection point for both new and existing refrigeration systems is provided.

SUMMARY

The present invention relates to a positive shutoff device for a connection point of a refrigeration system, where the refrigeration system includes a piping network that circulates a refrigerant to a compressor, a condenser, an expansion device, and an evaporator. The connection point includes a manually-actuatable valve defining a passageway to permit charging and pressure-testing of the refrigeration system. The positive shutoff device includes a first fitting engagable with the connection point and having a raised actuator that actuates the manually-actuatable valve when the first fitting engages the connection point, and a shutoff valve having a first end coupled to the first fitting and a second end coupled to a second fitting. The shutoff valve is operable for use in a closed position to prevent flow therethrough and an open position to permit flow therethrough, so that the refrigeration system may be charged or tested by connecting charging or test equipment to the second fitting and positioning the shutoff valve in the open position, and the connection point may be positively shut off to prevent leakage of refrigerant through the connection point by positioning the shutoff valve in the closed position.

DETAILED DESCRIPTION

Referring to the FIGURES, a refrigeration system is shown for use with a plurality of temperature controlled storage devices, where the storage devices may have different storage temperature requirements (e.g. "low temperature," such as approximately −20° F., and "medium temperature," such as approximately 25° F.). However, the various temperatures of the storage devices, refrigerants and liquid coolants illustrated or described in the various embodiments, are shown by way of example only. A wide variety of other temperatures and temperature ranges may be used to suit any particular application and are intended to be within the scope of this disclosure.

Figure 1:
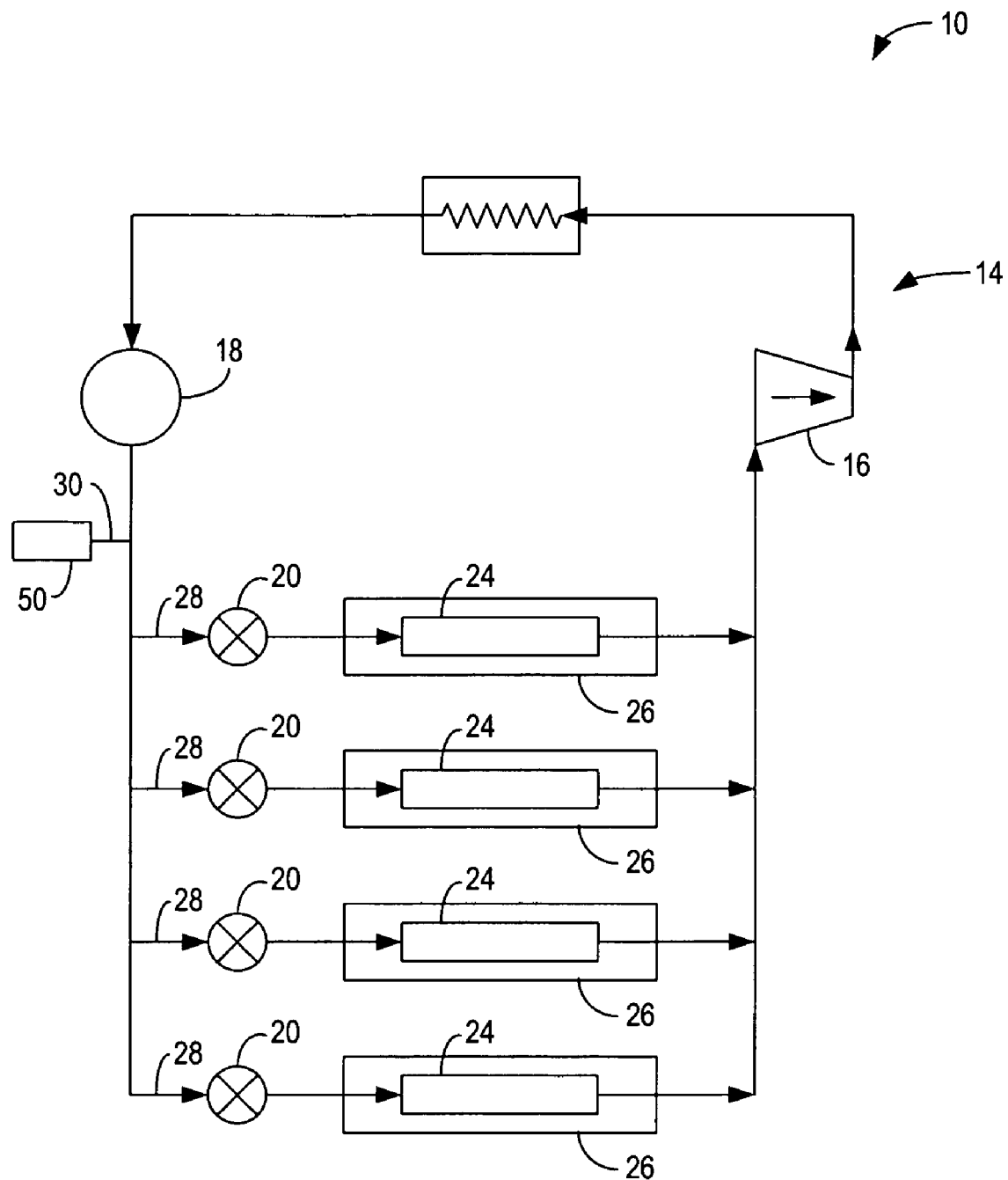
FIG. 1 is a schematic diagram of a refrigeration system having a connection point and a positive shutoff device, according to an exemplary embodiment.

Referring to FIG. 1, a refrigeration system 10 includes a piping network 14 (e.g. tubing, conduit, piping, etc.) interconnecting a plurality of refrigeration system components shown for example to include a compressor 16, a condenser (e.g. air-cooled, water-cooled, etc.), a receiver 18 to collect condensed refrigerant, and one or more expansion devices 20, shown for example as four (4) expansion valves for expanding the liquid refrigerant to a saturated liquid-vapor refrigerant for use in a cooling device 24 (e.g. evaporator in the form of a cooling coil, micro-channel coil, etc.) in a temperature-controlled storage device 26 (e.g. refrigerated display case, etc.). According to the illustrated embodiment, the piping network 14 includes multiple parallel branch lines 28 that supply refrigerant to each of the temperature-controlled storage devices 26 (e.g. four (4) branch lines for four (4) temperature-controlled storage devices), however, any number of branch lines, in any suitable configuration (e.g. series, parallel, series-parallel, etc.) may be used according to any alternative embodiments. The refrigerant is circulated in a closed-loop circuit through the piping network and the refrigeration system components to provide a source of cooling to the cooling devices in the temperature-controlled storage devices. According to other embodiments, the refrigeration system may include a liquid coolant (e.g. water, glycol, etc.) circulated within another loop (e.g. secondary coolant loop, etc.). All such types of refrigeration and/or cooling systems are intended to be within the scope of the disclosure.

Piping network 14 also includes a connection point 30 (e.g. pipe stub, branch, fitting, etc.), for use in connecting (e.g. temporarily, etc.) various equipment associated with set-up, operation or maintenance of the refrigeration system. For example, connection point 30, may be used to connect charging equipment (not shown) for charging the refrigerant system 10 with a refrigerant, such as R404A, carbon dioxide ($CO_2$), or other suitable refrigerant. Alternatively, the connection point may be used on a liquid coolant line for charging, testing and/or draining the liquid coolant line. Connection point 30 is shown to be located on a "liquid" portion of the refrigeration system (i.e. on the piping network 14 between the receiver and the expansion device(s)), however, the connection point may be provided at any suitable location on the piping network. Connection point 30 may also be used for connecting other equipment, such as testing equipment (e.g. pressure testing equipment, etc.) for testing and/or monitoring the pressure and/or leak-tightness of the refrigeration system. Connection point may also serve as a location for draining a liquid coolant or recapturing a refrigerant contained within the piping network. Connection point 30 typically serves as part of a pressure boundary for the piping network 14 and is intended to provide a location where charging and/or testing equipment can be readily connected and disconnected without a significant loss of refrigerant from the refrigeration system 10. However, typical connection points often use equipment that tends to leak slowly over extended periods of time, or may fail suddenly, which causes or contributes to a degradation or loss of refrigerant charge in the refrigeration system.

Figure 2:
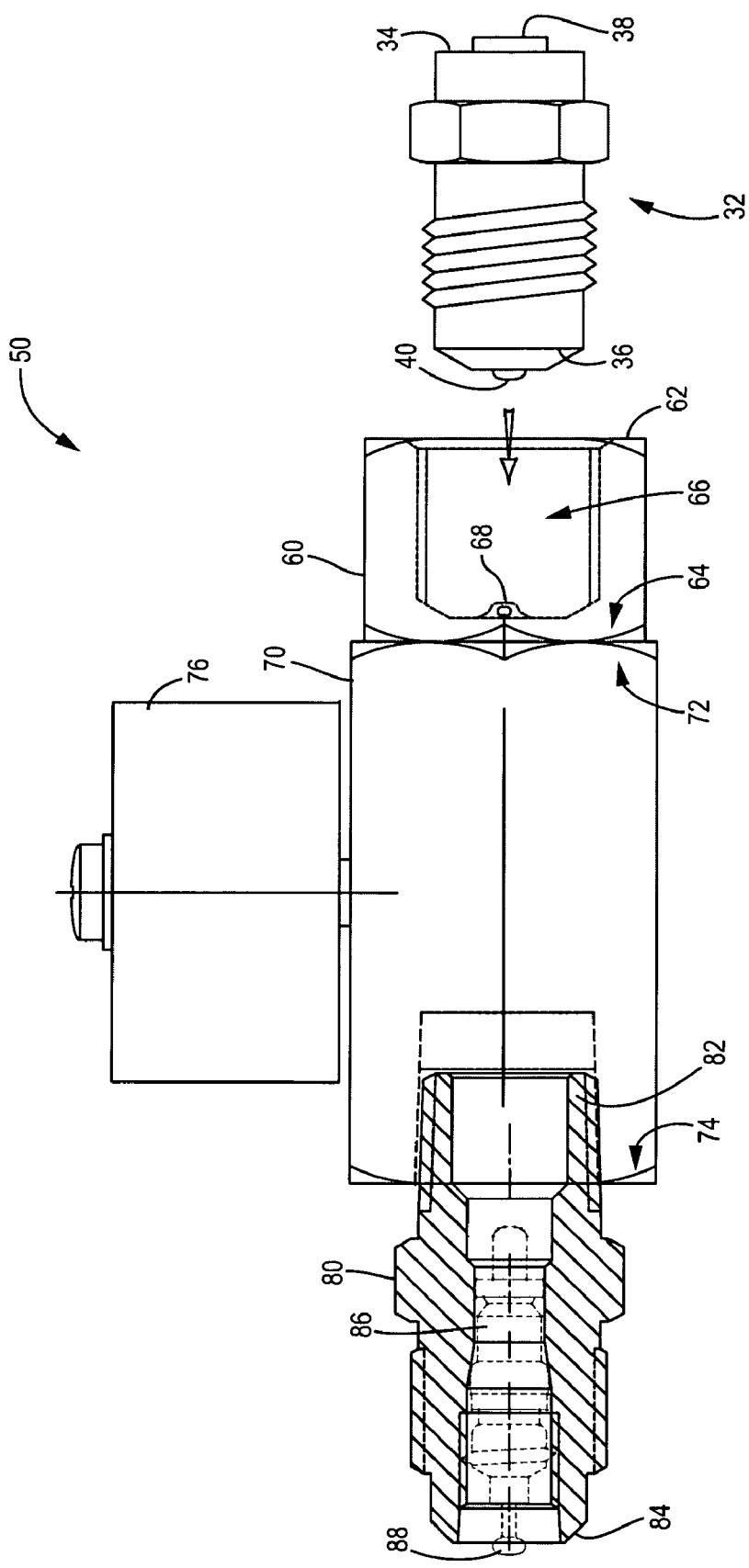
FIG. 2 is a schematic diagram of a positive shutoff device for the connection point on the refrigeration system of FIG. 1, according to an exemplary embodiment.

According to one embodiment shown in more detail in FIG. 2, connection point 30 includes a fitting 32 having a first end 34 that connects (e.g. by a threaded connection, soldering, brazing, etc.) to the piping network 14 and a second end 36 that connects to the positive shutoff device 50. Fitting 32 is shown to include a manually-actuatable valve 38 (e.g. a poppet-type valve such as a Schrader valve, etc.) disposed within an internal passageway of fitting 32 to provide controlled access to the piping network 14 of the refrigeration system (e.g. for charging, testing, depressurizing, etc.). Manually-actuatable valve 38 includes a movable valve stem 40 that can be moved (e.g. depressed, shifted, shuttled, etc.) against a spring force (or a force from refrigerant pressure within the piping network, or the like) to provide a clearance for a flow path within the internal passageway of the fitting 32.

Referring further to FIG. 2, a positive shutoff device 50 for the connection point 30 of the refrigeration system 10 is shown according to an exemplary embodiment. Positive shutoff device 50 is shown to include a first fitting 60, a shutoff valve 70, and a second fitting 80. First fitting 60 (e.g. a female flare fitting, such as a ¼ inch, ⅜ inch or other suitable size female flare fitting or other type of fitting of a suitable size) has a first end 62 that connects to second end 36 of fitting 32 of the connection point 30, and a second end 64 that couples or connects to a first end 72 of the shutoff valve 70, in a substantially leak-tight manner (e.g. by threaded connection with a suitable thread sealant or the like, etc.). According to one embodiment, first fitting 60 includes an internal region 66 having a raised actuator segment 68 (e.g. actuator, "Schrader depressor", etc.). As the internal region 66 of first fitting 60 receives the second end 36 of fitting 32, the raised actuator segment 68 engages (e.g. contacts, etc.) and moves valve stem 40 to actuate the manually actuatable valve 38 of the connection point 30 (i.e. opens the passageway within fitting 32 of connection point 30). According to alternative embodiments, the first fitting may be provided without a raised actuator segment, such as for applications where fitting 32 is provided without an internal manually actuatable valve, or where the shutoff valve is provided with a suitable projection that is operable to engage the valve stem 40.

Referring further to FIG. 2, the shutoff valve 70 includes a first end 72 and a second end 74, and is operable (e.g. manually actuatable, etc.) between a first position (e.g. closed, etc.) and a second position (e.g. open, etc.). According to one embodiment, shutoff valve is a manually-actuatable ball-type valve, such as are commercially available from JB Industries of Aurora, Ill. The first end 72 of shutoff valve 70 connects to the second end 64 of the first fitting 60 in a substantially leak-tight manner (e.g. by threaded connection with a suitable thread sealant or the like, etc.). Thus, when shutoff valve 70 is coupled to first fitting 60, and first fitting 60 is coupled to the fitting 32 of connection point 30, access to the pressure boundary of the piping network 14 is controlled by manually actuating the shutoff valve 70 between the open position (where the flow path is through the open shutoff valve 70, the first fitting 60, and the passageway within fitting 32 via the depressed valve stem 40 of the manually-actuatable valve 30), and the closed position, where the pressure boundary of the piping network 14, includes the shutoff valve 70. According to other embodiments, the shutoff valve may be another type of valve, such as a globe valve, gate valve, needle valve, control valve, or other valve capable of providing a positive shutoff and maintaining a pressure boundary for the system.

According to the illustrated embodiment, shutoff valve 70 is shown with a manually-actuatable handle 76, however, according to other alternative embodiments, the shutoff valve may be provided with another type of actuator, such as a solenoid, motor, pneumatic, hydraulic, or other type of remotely actuatable actuator. Such a remote actuator may be used to facilitate remote or automatic charging of the refrigeration system, such as upon a degradation of refrigeration system below a predetermined pressure setpoint as monitored by a suitable pressure sensing device (not shown) configured to provide a signal to actuate the shutoff valve to an open position and to return the shutoff valve to a closed position upon restoration of the pressure of the refrigerant or coolant in the refrigeration system to a predetermined pressure. Such a remotely actuatable charging system may be configured for use with an existing system as a retrofit feature by connecting to an existing fitting and using a signal from an existing pressure sensing device, or may be provided as a feature of a new refrigeration system.

Referring further to FIG. 2, second fitting 80 of the positive shutoff device 50 is shown according to an exemplary embodiment. Second fitting 80 (e.g. a male flare fitting, such as a ¼ inch male flare fitting or other type of fitting of a suitable size) has a first end 82 that couples or connects to the second end 74 of the shutoff valve 70, and a second end 84 configured to couple to charging and/or testing equipment (not shown), in a substantially leak-tight manner (e.g. by threaded connection with a suitable thread sealant or the like, quick-disconnect, etc.). Second fitting 80 is shown to include a manually-actuatable valve 86 (e.g. a poppet-type valve such as a Schrader valve, etc.) disposed within an internal passageway of second fitting 80 to provide controlled access to the piping network 14 of the refrigeration system (e.g. for charging, testing, depressurizing, etc.) when the shutoff valve 70 is in the open position. Manually-actuatable valve 86 includes a movable valve stem 88 that can be moved (e.g. depressed, shifted, shuttled, etc.) against a spring force (or a force from refrigerant pressure within the piping network 14 up through the shutoff valve 70, or the like) to provide a clearance for a flow path within the internal passageway of the second fitting 80. An end of valve stem 88 is disposed proximate the second end 84 of the second fitting 80 and is configured to be engaged (e.g. moved, shifted, shuttled, etc.) by contact with charging and/or testing equipment when such equipment is connected to the second end 84 of the second fitting 80 for charging and/or testing the refrigeration system.

According to alternative embodiments, manually actuatable valve 38 may be omitted and the pressure boundary maintained by shutoff valve 70 and manually actuatable valve 86. Alternatively, manually actuatable valve 86 may be omitted and the pressure boundary maintained by shutoff valve 70 and manually actuatable valve 38.

According to any exemplary embodiment, the positive shutoff device for a connection point of a refrigeration system includes a shutoff valve disposed between a first fitting that engages and opens a passageway to the piping network, and a second fitting that engages with (and opens in response to) connection of charging and/or testing equipment. The first and second fittings and the shutoff valve may be preassembled as a single integrated unit configured to be coupled directly to a connection point of a new or existing refrigeration system. According to an alternative embodiment, a second fitting may be omitted from the positive shutoff device, in the event that such a fitting is included as a part of the charging and/or testing equipment. The positive shutoff device for a connection point of a refrigeration system may be installed as new equipment on original installations of refrigeration systems, or may be provided as a retrofit or enhancement to connection points of existing refrigeration systems. The positive shutoff device for a connection point of a refrigeration system is intended to minimize or eliminate the typical leakage that tends to occur with conventional connection points on refrigeration systems, and is easily and conveniently installed, and provides positive shutoff and isolation of the pressure boundary of the piping network by effectively moving the pressure boundary of the piping network from the connection point to the manual shutoff valve. The presence of the manually actuatable valve in the second fitting also enhances the leak-tightness of the system by preventing refrigerant leakage from the system in the event that the shutoff valve is inadvertently or unintentionally opened without charging or testing equipment coupled thereto.

It is important to note that the construction and arrangement of the elements and embodiments of the positive shutoff device for a connection point of a refrigeration system provided herein are illustrative only. Although only a few exemplary embodiments of the present invention have been described in detail in this disclosure, those skilled in the art who review this disclosure will readily appreciate that many modifications are possible in these embodiments (such as variations in features such as components, valves, and fittings; variations in valve, fitting and thread sizes, structures, shapes, dimensions and proportions of the components of the system, use of materials, etc.) without materially departing from the novel teachings and advantages of the invention. According to other alternative embodiments, the positive shutoff device for a connection point of a refrigeration system may be used with any device using a refrigerant or other coolant for transferring heat from one space to be cooled to another space or source designed to receive the rejected heat and may include commercial, institutional or residential refrigeration systems. Further, it is readily apparent that variations of the positive shutoff device for a connection point of a refrigeration system and its components and elements may be provided in a wide variety of types, shapes, sizes and performance characteristics, or provided in locations external or partially external to the refrigeration system. For example, components of a cooling system may be provided as rack-mounted system, or as a custom-installed hard-piped system, or may be provided as a modular unit or package. Accordingly, all such modifications are intended to be within the scope of the invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A positive shutoff device for a connection point of a refrigeration system, the refrigeration system including a piping network configured to circulate a refrigerant to at least a compressor, a condenser, an expansion device, and an evaporator, and the connection point includes a manually-actuatable valve defining a passageway to permit at least one of charging and pressure-testing of the refrigeration system, the positive shutoff device comprising:

a first fitting engagable with the connection point in a substantially leak-free manner, the first fitting having an inner surface with a fixed projection extending therefrom to define a raised actuator segment configured to actuate the manually-actuatable valve and maintain the manually-actuatable valve in an open position when the first fitting engages the connection point; and maintain the manually-actuatable valve in an open position; and a shutoff valve having a first end and a second end, the first end coupled to the first fitting in a substantially leak-free manner and the second end coupled to a second fitting in a substantially leak-free manner, the shutoff valve operable for use in a closed position to extend a pressure boundary for the refrigeration system from the manually-actuatable valve to the shutoff valve when the first fitting is engaged with the connection point, thereby defining a first leakage barrier to prevent leakage of the refrigerant from the refrigeration system through the open manually-actuatable valve, and an open position to permit flow therethrough;

wherein the second fitting comprises a hollow passage having a Schrader valve core therein, the Schrader valve core including a valve stem having a closed position defining a second leakage barrier to prevent leakage of the refrigerant from the refrigeration system if the shutoff valve is opened, the valve stem configured to be actuated to an open position when one of a charging equipment or a test equipment are connected to the second fitting;

so that the refrigeration system may be charged or pressure tested by connecting one of the charging equipment or the test equipment to the second fitting and positioning the shutoff valve in the open position, and the connection point may be positively shut off with the manually-actuatable valve in the open position to prevent leakage of refrigerant through the connection point by positioning the shutoff valve in the closed position and removing the charging equipment or the test equipment.

2. The device of claim 1 wherein the shutoff valve comprises a ball valve.

3. The device of claim 1 wherein the shutoff valve comprises a globe valve.

4. The device of claim 1 wherein the manually-actuatable valve of the connection point comprises a Schrader valve.

5. The device of claim 4 wherein the raised actuator segment comprises an internal projection within the first fitting that is configured to depress a valve stem of the Schrader valve when the first fitting engages the connection point.

6. The device of claim 1 wherein the first fitting comprises a ¼ inch female flare fitting.

7. The device of claim 6 wherein the second fitting comprises a ¼ inch male flare fitting.

8. The device of claim 1 wherein the first fitting and the shutoff valve and the second fitting are provided as a preassembled unit.

9. The device of claim 8 wherein the preassembled unit is configured for use with at least one of an existing refrigeration system and a new refrigeration system.

10. The device of claim 1 wherein the shutoff valve includes an actuator.

11. The device of claim 10 wherein the actuator comprises a manually actuatable handle.

12. The device of claim 10 wherein the actuator comprises a remotely actuatable actuator configured to facilitate automatic charging of the piping network.

* * * * *

UNITED STATES PATENT AND TRADEMARK OFFICE
CERTIFICATE OF CORRECTION

| | |
|---|---|
| PATENT NO. | : 8,302,411 B2 |
| APPLICATION NO. | : 12/355558 |
| DATED | : November 6, 2012 |
| INVENTOR(S) | : J. Scott Martin |

It is certified that error appears in the above-identified patent and that said Letters Patent is hereby corrected as shown below:

Claim 1; Column 6; Lines 4 and 5.

Delete: "maintain the manually-actuatable valve in an open position; and"

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,302,411 B2 | Page 1 of 1 |
| APPLICATION NO. | : 12/355558 | |
| DATED | : November 6, 2012 | |
| INVENTOR(S) | : Martin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Nineteenth Day of May, 2015

Michelle K. Lee
*Director of the United States Patent and Trademark Office*